United States Patent
Kawakubo et al.

(10) Patent No.: US 7,096,753 B2
(45) Date of Patent: Aug. 29, 2006

(54) ENGINE HAVING A CARTRIDGE TYPE TRANSMISSION

(75) Inventors: Hiroyuki Kawakubo, Saitama (JP); Toru Gunji, Saitama (JP); Hiromi Sumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 10/885,590

(22) Filed: Jul. 8, 2004

(65) Prior Publication Data

US 2005/0081664 A1 Apr. 21, 2005

(30) Foreign Application Priority Data

Jul. 23, 2003 (JP) ............................. 2003-278596
Aug. 27, 2003 (JP) ............................. 2003-303358

(51) Int. Cl.
*F16H 59/00* (2006.01)

(52) U.S. Cl. ...................................... 74/337.5; 180/344

(58) Field of Classification Search ............... 74/337.5, 74/606 R; 180/344, 346, 216
See application file for complete search history.

(56) References Cited

U.S. PATENT DOCUMENTS

| | | | | |
|---|---|---|---|---|
| 4,523,655 | A | * | 6/1985 | Keenan et al. ............... 180/9.1 |
| 4,589,294 | A | * | 5/1986 | Keenan et al. ................ 74/331 |
| 4,606,310 | A | * | 8/1986 | Makino .................... 123/192.2 |
| 6,155,125 | A | * | 12/2000 | Negherbon et al. ........... 74/325 |

FOREIGN PATENT DOCUMENTS

JP 63-22358 Y2 6/1988
JP 2-29906 A 7/1990

* cited by examiner

*Primary Examiner*—Dirk Wright
(74) *Attorney, Agent, or Firm*—Birch, Stewart Kolasch & Birch, LLP

(57) ABSTRACT

The cartridge type transmission is a transmission configured to be detachable and attachable from/to the crankcase, the main shaft is arranged on the cut surface BF of the crankcase, and the change spindle and the shift fork shaft are pivotally supported in the upper crankcase, which is positioned on the upper side of the cut surface BF. The counter shaft is pivotally supported in the lower crankcase, which is positioned on the lower side of the cut surface BF.

20 Claims, 11 Drawing Sheets

ENGINE HAVING A CARTRIDGE TYPE TRANSMISSION

CROSS-REFERENCE TO RELATED APPLICATIONS

The present application claims priority under 35 USC 119 to Japanese Patent Application Nos. 2003-278596 filed on Jul. 23, 2003 and 2003-303358 filed on Aug. 27, 2003 the entire contents thereof are hereby incorporated by reference.

BACKGROUND OF THE INVENTION

1. Field of the Invention

The present invention relates to an engine having a cartridge type transmission and to a cartridge drum transmission that is freely detachable and attachable from/to the engine.

2. Description of Background Art

There is a type of engine, serving as an internal combustion engine for a motorcycle and the like, which has a transmission for rotating a shift drum by a driver's manipulation to shift gears. See, for example, Examined Japanese Patent Publication No. 2-29906, Page 5, FIG. 4. The transmission described in Examined Japanese Patent Publication No. 2-29906 includes a main shaft, a counter shaft, a shift fork shaft, and a shift drum, which are pivotally supported in a crankcase which is divided into two parts on the left and right sides. The shift drum is arranged forward of the main shaft and on the downside thereof. The counter shaft is arranged backward of the main shaft and on the downside thereof. The shift fork shaft is arranged on the downside of the main shaft, and a shift fork for the main shaft and a shift fork for the counter shaft are inserted into one shift fork. Furthermore, a change spindle serving as an oscillation center for the shift arm which rotates the shift drum is arranged below the shift drum.

There is also a type of engine, serving as an internal combustion engine for a motorcycle and the like, which has a shift drum transmission for rotating a shift drum by a driver's manipulation to shift gears. See, for example, Japanese Utility Model Laid-Open Application Publication No. 63-22358, Pages 2 and 3, and FIGS. 1 and 2.

As for this type of shift drum transmission, a cam plate is fixed on one end of the shift drum for shifting gears. The cam plate has a shape of a star, on the periphery of which grooves that are respectively associated with the transmission gears are provided. In addition, on the cam plate, drum pins are disposed facing to the shift drum side. A hook piece of a shift arm which rotates the shift drum is engaged with the drum pins and a stopper roller, which stops the rotation of the shift drum, elastically contacts the grooves of the cam plate.

The shift arm is arranged at a more internal side than the cam plate, and is coupled with a change pedal which a driver operates with his/her foot. When the driver operates the change pedal, the shift arm is rotated, so as to allow the cam plate and the shift drum, which are engaged via the drum pins, to start rotating. At this timing, when the stopper roller is disengaged from a groove, causing the shift drum to rotate, and then, the stopper roller becomes engaged with the next groove, the rotation of the shift drum is stopped. As a result, the transmission gear of the shift drum type transmission is changed.

SUMMARY OF THE INVENTION

However, in the first type of transmission as described above, the change spindle, the shift fork shaft, the shift drum, and the counter shaft are arranged in a concentrated manner. Therefore, there is a problem that the downside portion of the transmission becomes large in size, resulting that the size of the engine is widened longitudinally. In particular, as disclosed in Examined Japanese Patent Publication No. 2-29906, when the shift drum, the shift fork, and the counter shaft are arranged longitudinally in this order, the longitudinal length of the transmission becomes large, thereby upsizing the engine. Furthermore, if the shift drum and the change spindle are arranged on the downside of the engine, there is a limitation in designing a layout for an element such as an oil pump which provides lubricating oil to the engine.

Furthermore, in order to configure the transmission as a cartridge type transmission which is detachable and attachable with respect to the crankcase, it is desirable that the transmission is of a small-size for facilitating such detachment and attachment.

Furthermore, it is desirable that the cartridge type transmission is easily detached and attached from/to the engine.

The present invention has been made in view of such problems, and an object of the present invention is to downsize the cartridge type transmission, and to shorten the length of the engine in the longitudinal direction.

In addition, when the second type of shift drum transmission as described above is configured as a cartridge type transmission, which is detachable and attachable from/to an engine, the shift arm cooperative with the change pedal should be removed in advance, before detaching the transmission from the engine. It is because the shift arm for rotating the shift drum is positioned at a more internal side than the cam plate.

Furthermore, in order to easily detach and attach the shift drum transmission from/to the engine, it is desirable to downsize the shift drum transmission.

The present invention was made in view of the above problems. It is an object of the present invention to facilitate detachment and attachment of the shift drum transmission configured as a cartridge type transmission, thereby enhancing maintainability.

The present invention that solves the above problems is directed to an engine 15 having a cartridge type transmission 100 that includes a crankcase 31 which comprises an upper crankcase 44 and a lower crankcase 45 which are allowed to be divided vertically, a crankshaft 47 and a main shaft 102, which are pivotally supported by a cut surface BF of the crankcase, the cartridge type transmission being configured such that rotary power of the main shaft is transferred to the counter shaft 103 and being detachable without separating the crankcase. A change spindle 124 and at least one shift fork shaft 113 are pivotally supported by the upper crankcase.

In the engine having this cartridge type transmission, the main shaft is arranged on a cut surface of the crankcase, and the change spindle and at least one shift fork shaft is arranged in the upper side of the main shaft. Accordingly, the change spindle and the shift fork shaft, also shift functional members cooperative therewith, for example, a shift drum, are all arranged in the upper position of the crankcase. Therefore, it is possible to utilize effectively a space that has not been used conventionally. Furthermore, it is possible to prevent the elements constituting the transmission from concentrating in the lower side of the main shaft.

The present invention provides an engine having the cartridge type transmission wherein the counter shaft is pivotally supported by the lower crankcase.

In the engine having the cartridge type transmission, the change spindle and the like are arranged in the upper side of the cut surface, the counter shaft is arranged below the main shaft. Since the elements constituting the transmission are arranged in a vertically divided manner, the length in the longitudinal direction of the transmission can be shortened.

The present invention provides an engine having a cartridge type transmission, including a crankshaft and a main shaft pivotally supported by a crankcase with the cartridge type transmission being configured such that a rotary power of the main shaft is transferred to a counter shaft and is detachable in the width direction of the crankcase. A shift arm 122 is provided for rotating a shift drum 105 and a transmission holder 101 of the cartridge type transmission are arranged in such a manner as to be divided into left and right sides of a vehicle.

In the engine having this cartridge type transmission, the shift arm and the transmission holder are arranged in such a manner as to be divided on left and right sides of the vehicle body, the cartridge type transmission can be detached or attached without removing the shift arm.

According to the present invention, since the change spindle and at least one shift fork shaft are arranged in the upper side of the cut surface of the crankcase, the shift drum and the like being cooperative with the change spindle and the shift fork, are arranged in a higher position on the crankcase. Therefore, the space in the upper rearward side of the engine can be utilized effectively to make it possible to downsize the cartridge type transmission. Therefore, detachment/attachment of the transmission becomes easier, thereby enhancing maintainability. Furthermore, with the downsizing of the cartridge type transmission, it is possible to shorten the length in the longitudinal direction of the engine. Furthermore, since the elements constituting the transmission are not concentrated in the lower side of the main shaft, the flexibility of the layout for the components to be arranged in the lower part of the engine can be enhanced.

According to the present invention, the main shaft is arranged on the cut surface between the upper and the lower crankcases, and the change spindle and the like are arranged in the upper side of the cut surface, while the counter shaft is arranged in the lower side of the cut surface. Therefore, the elements constituting the transmission are arranged both above and below with respect to the main shaft. Accordingly, the length in the longitudinal direction of the cartridge type transmission can be shortened. Thus, detachment/attachment of the transmission is simplified. Since the distance from the crankshaft to the counter shaft is shortened, the length in the longitudinal direction of the engine can be reduced.

According to the present invention, the shift arm and the transmission holder are arranged in a divided manner on left and right sides of the vehicle body. Therefore, the transmission holder can be detached without removing the shift arm, and detachment/attachment of the cartridge type transmission can be simplified.

The present invention is directed to a cartridge type shift drum transmission, which is freely detachable and attachable from/to an engine 15 having a configuration wherein a plurality of shift forks 110, 111, 112 are actuated by rotating a shift drum 105 so that gears are shifted, and the rotation of the shift drum is controlled by a stopper plate 152 wherein, the stopper plate is arranged on one end, for example, the right end 116 in the embodiment, of the shift drum, and a plurality of drum pins 121 for rotating the shift drum are arranged on the other end, for example, the left end 108 in the embodiment, of the shift drum.

According to the shift drum transmission as described above, the stopper plate for controlling the rotation of the shift drum and the drum pins for rotating the shift drum are arranged in a separated manner into both ends of the shift drum. Therefore, when the drum pins are arranged into a direction opposite to the direction for detaching the shift drum transmission, it is possible to release the engagement between the shift arm and the drum pins without removing the shift arm. Therefore, without removing the shift arm, the shift drum transmission can be detached and attached from/to the engine. Furthermore, the stopper plate and the drum pins are arranged in a separated manner to both ends of the shift drum with the layouts for the stopper roller elastically contacting with the stopper plate. Thus, the shift plate engaged with the drum pins can be simplified.

The present invention is directed to a shift drum transmission, wherein a sensor 202 for detecting the rotational position of the shift drum is arranged in the vicinity of the stopper plate, along the direction substantially vertical with respect to the rotational axis of the shift drum.

According to the shift drum transmission, if a sensor is provided for allowing the driver to be aware of a specific transmission gear of the shift drum transmission, the width of the shift drum can be shortened as compared to a case where such a sensor is provided on the axis line of the shift drum.

According to the present invention, the stopper plate and the drum pin are arranged in a separated manner at both ends of the shift drum, it is possible to detach and attach the shift drum transmission from/to the engine without removing the shift plate. Therefore, checks and components replacement of the shift drum transmission become easier, thereby enhancing maintainability. Furthermore, the stopper plate and the drum pins are arranged in a separated manner at both ends. Thus, the layouts for the components cooperative therewith can be simplified.

According to the present invention, it is possible to arrange the sensor, while the axis length of the shift drum is restricted. Therefore, the shift drum transmission can be downsized, thereby enhancing maintainability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Best modes for carrying out the invention will be explained in detail with reference to the attached drawings. It is to be noted that in the following explanation, a "front side" means a direction into which a vehicle goes forward, and a "rear side" means a direction into which the vehicle goes back. Furthermore, the right side and the left side respectively indicate the right side and the left side with respect to the direction the vehicle goes forward.

Figure 1:
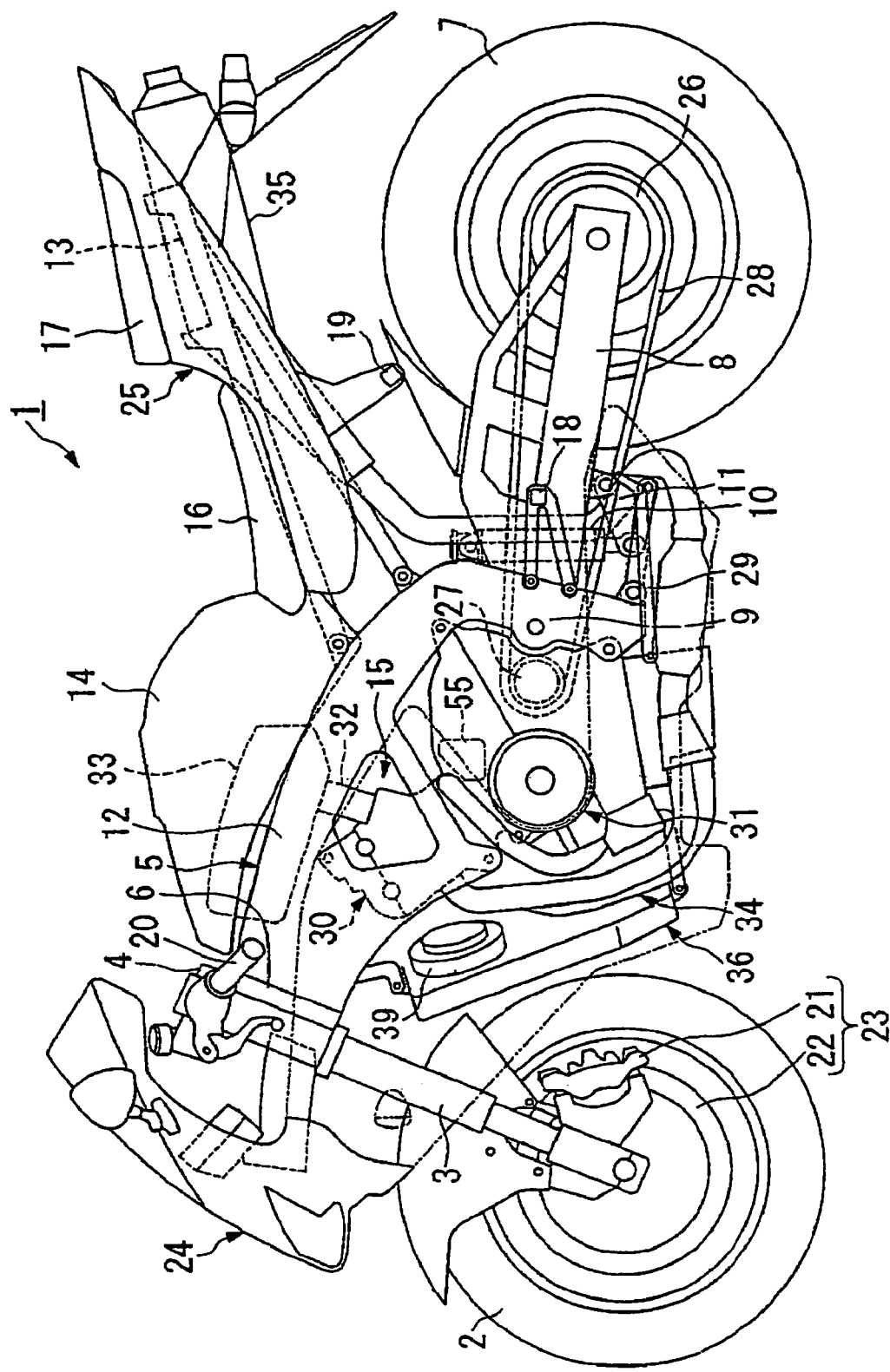
FIG. 1 is a side view of the motorcycle according to the embodiment of the present invention.

As shown in FIG. 1, a front wheel 2 of a motorcycle 1 is pivotally supported by a front fork 3, and the front fork 3 is also supported pivotally, via a top bridge 4, by a head pipe 6 mounted on the front end portion of a body frame 5, in such a manner that the steering of the front fork 3 is possible. A rear wheel 7 of the motorcycle 1 is pivotally supported by a rear fork 8, and the rear fork 8 is also supported pivotally by a pivot portion 9 and an engine 15, which are provided at the intermediate portion of the body frame 5, in such a manner that the swinging of the rear fork 8 is possible. In the vicinity of the pivot shaft of the rear fork 8, the upper end of a rear cushion unit 10 is mounted. The lower end of the rear cushion unit 10 is mounted on the lower portion of the engine 15 via a link mechanism 11, whereby loads propagated from a road surface to the body, via the rear wheel 7 and a rear fork 8 can be effectively absorbed.

From the upper portion of the head pipe 6, the main frame 12 of the body frame 5 extends and is separated to left and right sides, towards the rear lower side, and the rear end is bent downwardly to be connected to the pivot portion 9. The rear of the main frame 12 is coupled with a seat rail 13 of the body frame 5. A fuel tank 14 is disposed above the main frame 12 and the engine 15 is disposed below the main frame 12.

In the rear of the fuel tank 14, a seat 16 for a driver and a pillion seat 17 for a rear passenger are each supported by the seat rail 13. A step 18 for the driver is mounted in the rear of the pivot portion 9 of the main frame 12, and a step 19 for the rear passenger 19 is mounted below the seat rail 13. Furthermore, handles 20, making a pair right-and-left, are mounted on the upper end of the front fork 3.

On the lower end of the front fork 3, a brake caliper 21 is mounted, and also a brake rotor 22 provided for the brake caliper 21 is mounted on the front wheel 2, thereby constituting a front brake unit 23. It is to be noted that rear brake unit (not illustrated) having the same structure as that of the front brake unit 23 of the front wheel is provided on the right side of the rear wheel 7.

The front part of the body of the motorcycle 1 is covered by a front cowl 24, and a rear cowl 25 covers around the seat rail 13. A rear sprocket 26 is mounted on the left side of the rear wheel 7 with a drive chain 28 looped over the rear sprocket 26. A drive sprocket 27 is disposed on the rear left side of the engine 15 thereby transferring a driving force of the engine to the rear wheel 7. A side stand 29, which can be stored, is disposed at the left side lower portion of the body frame 5. With this side stand 29, the motorcycle 1 can be supported with the body thereof leaning to left side.

The engine 15 of the present embodiment is a water-cooled in-line 4-cylinder engine, and a cylinder body 30 is disposed onto a crankcase 31 in a state of slightly leaning forward. Throttle bodies 32 respectively associated with the cylinders are connected to the rear of the cylinder body 30, and each throttle body 32 is connected to an air cleaner case 33, being disposed between the main frame 12 and the fuel tank 14. Furthermore, in front of the cylinder body 30, an exhaust pipe 34 is connected to the cylinders. The exhaust pipe 34 curves downwardly from the front wall of the cylinder body 30, passes below the crankcase 31, and it is bent upwardly in the rear of the pivot portion 9. Then, it is connected to a silencer 35 which is supported by the seat rail 13.

In front of the exhaust pipe 34, a radiator 36 is disposed in a posture leaning slightly forward, similar to the cylinder body 30. The radiator 36 has a round type, the front surface thereof being curved in a concave shape, as well as the radiator being provided vertically from the upper portion of the cylinder body 30 to the lower portion of the crankcase 31. Radiator fans 39 making a pair right-and-left are mounted on the upper backside of the radiator 36.

Figure 2:
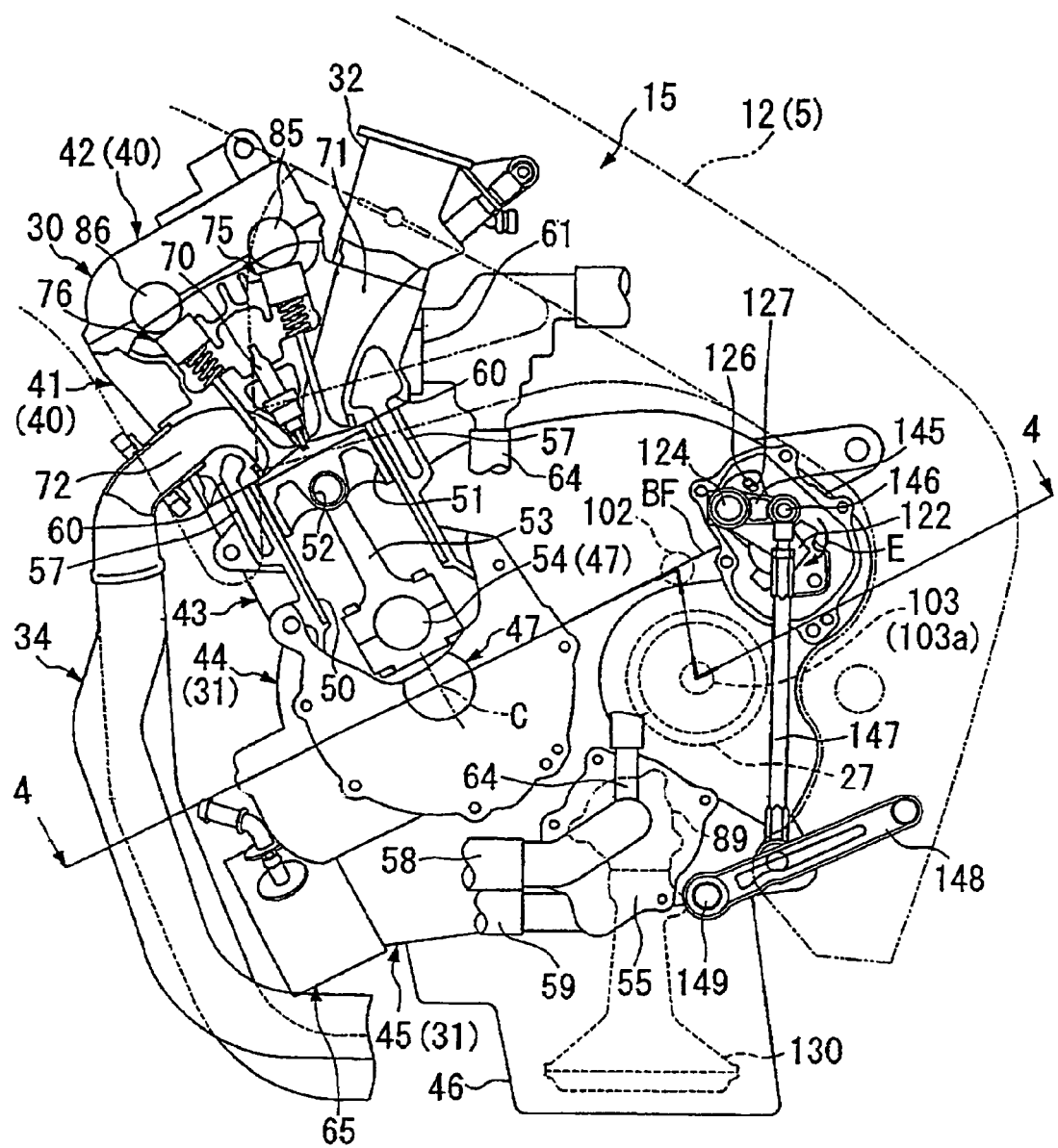
FIG. 2 is a left side view of the engine.
Figure 3:
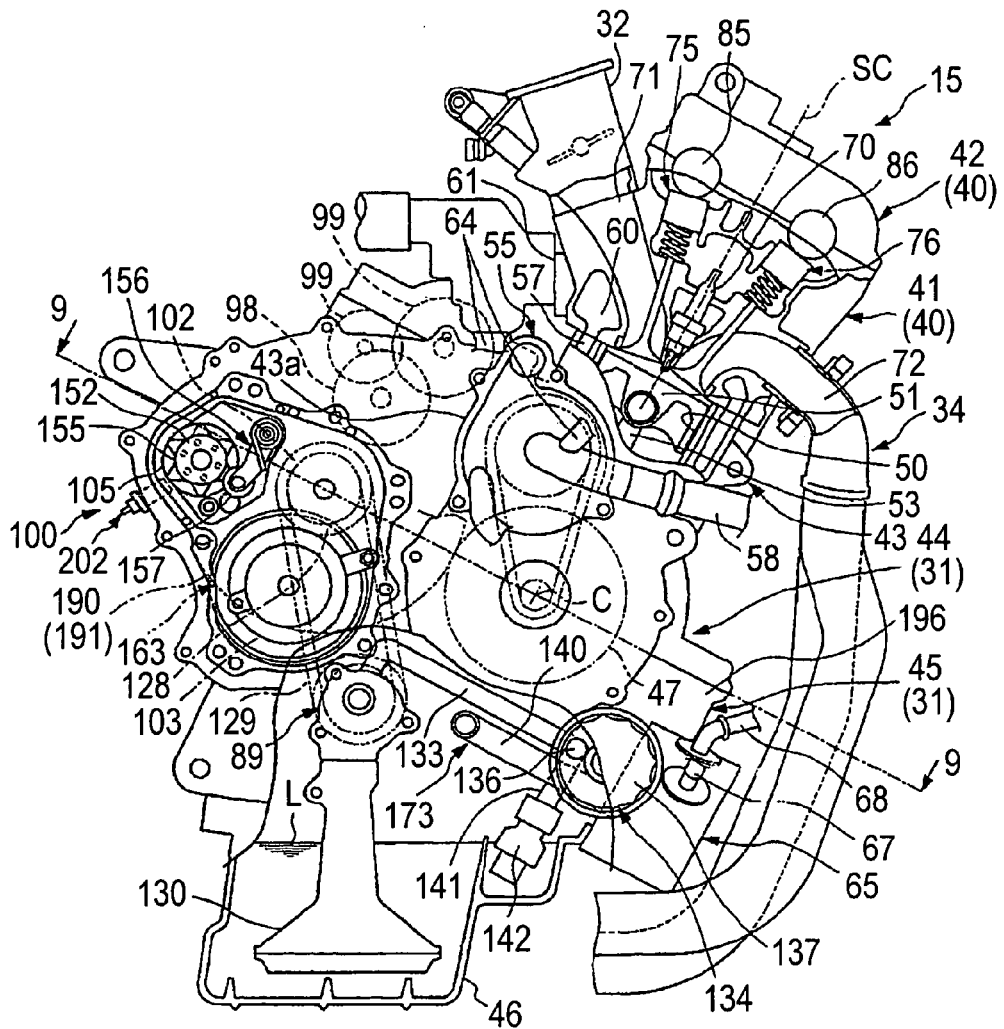
FIG. 3 is a right side view of the engine.
Figure 8:
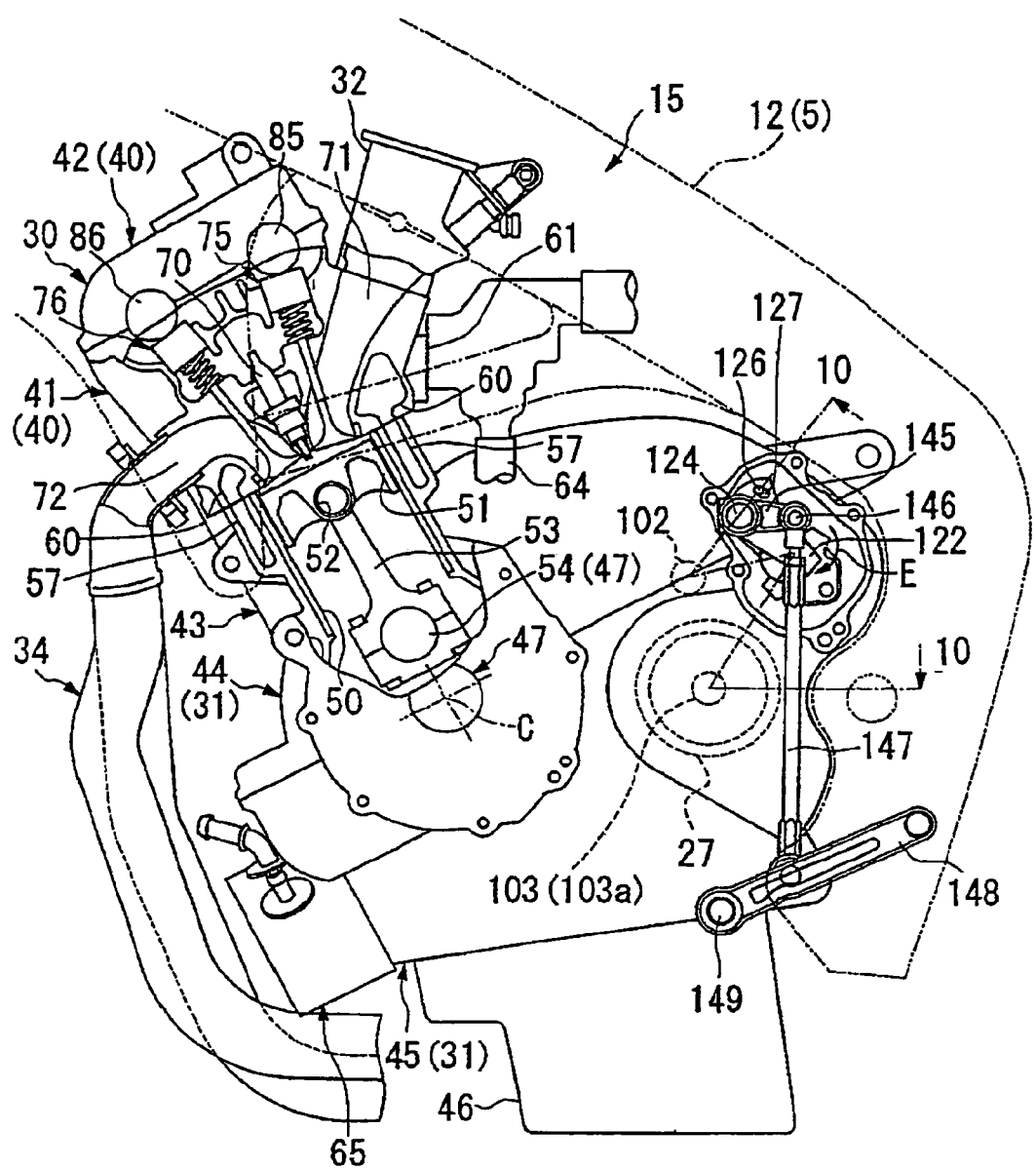
FIG. 8 is a left side view of the engine.
Figure 9:
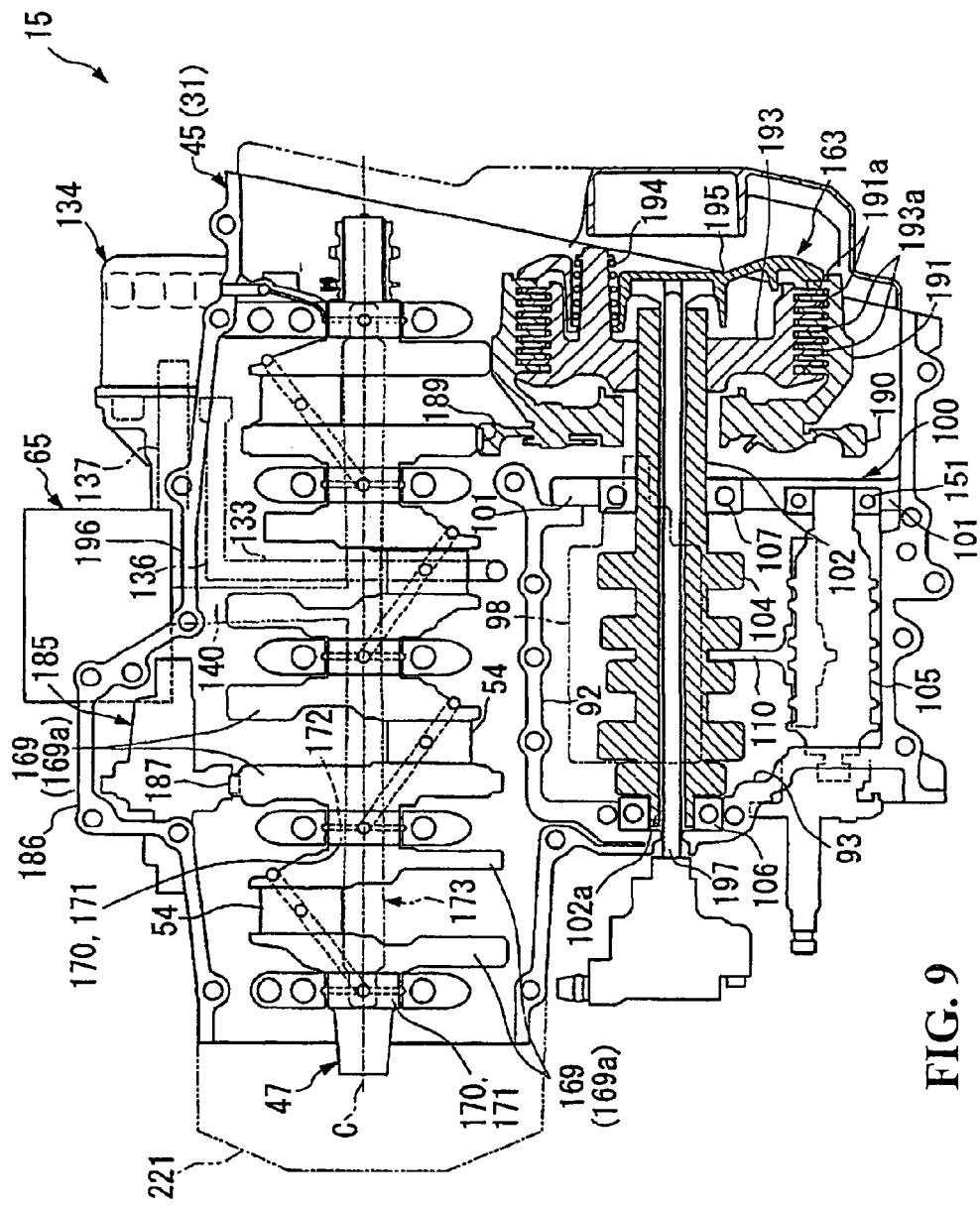
FIG. 9 is a cross-sectional view of FIG. 3, taken along line 9—9.

As shown in the left side-view of FIGS. 2 and 8 and the right side view of FIG. 3, the engine 15 includes a cylinder head 40 and a cylinder block 43 being main parts for the engine and the crankcase 31. Head body 41 and head cover 42, being divided, constitute the cylinder head 40. Upper crankcase 44 and lower crankcase 45, being divided, constitute the crankcase 31. The upper crankcase 44 and cylinder block 43 are integrally molded, and an oil pan 46 is mounted below the lower crankcase 45. The head body 41 may be an aluminum alloy casting. The cut surface BF of the crankcase 31 is a surface forming a boundary between the upper crankcase 44 and the lower crankcase 45. In the side view, the cut surface has a slope up towards the rear side, following the forward leaning posture of the engine 15.

Spark plugs 70 are screwed up the head body 41 of the cylinder head 40, in such a manner to approach the combustion chambers, respectively, and intake ports 71 and exhaust ports 72 connecting the combustion chambers and the outside are respectively formed. The throttle body 32 is connected to the outside opening of each intake port 71, and the exhaust pipe 34 is connected to the outside opening of each exhaust port 72. Furthermore, valve seats are mounted on the combustion-chamber side openings of respective intake ports 71 and exhaust ports 72, and those openings are capable of opening and closing by the action of intake valves 75 and exhaust valves 76.

An intake side cam shaft 85 and an exhaust side cam shaft 86 for activating each intake valve 75 and exhaust valve 76 are disposed above the valves respectively, in parallel with an axis line C of the crankshaft 47. On the peripheral surfaces of the intake side cam shaft 85 and the exhaust side cam shaft 86, an intake side cam and an exhaust side cam (not illustrated), are respectively associated with the intake valve 75 and the exhaust valve 76.

Cam sprockets (not illustrated) are respectively provided on the right ends of the cam shafts 85, 86, and each of the cam shafts 85 and 86 is linked with the crankshaft 47 via cam chains connected to the cam sprockets. With the rotation of the crankshaft 47, each cam shaft 85, 86 rotates accordingly, whereby the intake valve 75 and the exhaust valve 76 can be actuated. It is to be noted that each cam shaft 85 and 86 is hollow, and the hollow portion serves as a path for engine oil (lubricating oil) L. Then, the engine oil L is supplied to each sliding surface from a predetermined oil hole.

Four cylinders 50 are formed to be aligned in the body width direction in the cylinder block 43. Furthermore, the pistons 51 are slidably fitted into the cylinders 50. As shown in FIGS. 2 and 8, each piston 51 is coupled with a connecting rod 53 via a crank pin 54 so that the connecting rod 53 is rotatable, as well as a large end of the connecting rod 53 is rotatably coupled with the crank pin 54 of the crankshaft 47, thereby converting the reciprocating motion of the piston 51 into a rotating motion with a central focus on the axis line C.

As shown in FIG. 3, in the lower portion of the crankcase 31, an oil pump 89 is disposed for pumping the engine oil L to appropriate points within the engine 15. The oil pump 89 is linked, via a chain 129, with an oil pump drive sprocket 128 that rotates with the main shaft 102 of the cartridge type transmission 100. The oil pump 89 starts actuation according to the rotation of the crankshaft 47. The engine oil L is reserved in the oil pan 46 that is fixed in the lower portion of the lower crankcase 45, and oil strainer 130 is soaked in the engine oil L thus reserved.

The upper end of the oil strainer 130 is connected to an intake opening of the oil pump 89, and a discharge opening of the oil pump 89 is connected to a first oil path 133 formed in the lower crankcase 45. The first oil path 133 extends upwardly from the discharge opening of the oil pump 89 and it is bent forward, and extends further forward, the front part leaning slightly downward. A cartridge type oil filter 134 is mounted detachably/attachably on the front wall 196 of the lower crankcase 45. The engine oil L flows from the oil inflow path 136 into the oil filter 134, and then, it flows out from the oil outflow path 137, and is guided to the water cooling type oil cooler 65.

The above described water cooling type oil cooler 65 is arranged somewhere in the center of the front wall 196 of the crankcase 31, and the oil filter 134 is mounted on the right side of the water cooling type oil cooler 65. The water cooling type oil cooler 65 is mounted on the front portion of the lower crankcase 45 which constitutes the crankcase 31, and cools with the coolant the engine oil L passing through internally. The coolant is introduced from an introducing hose 68 mounted on the oil pump 89. The coolant which has already cooled the engine oil L passing through the water cooling type oil cooler 65, is returned to a water pump 55 mounted on the left wall of the lower crankcase 45, via a lead-out hose 67.

A water pump 55 is mounted on the left side wall of the lower crankcase 45 of the engine 15. The water pump 55 is connected to a coolant introduction hose 58 for introducing coolant from the radiator 36 (see FIG. 1) and a bypass hose 64. Furthermore, the water pump 55 has a rotation axis to which an impeller is connected, and this rotation axis is arranged coaxially with the rotation axis of the oil pump 89 as shown in FIG. 2. Therefore, the rotation axis of the water pump 55 rotates with the main shaft 102, with the oil pump drive sprocket 128 and the chain 129 as shown in FIG. 3, and pressure is applied on the coolant by the impeller. The coolant under pressure is transported compressively from the coolant lead-out hose 56 to a cylinder side water jacket 57. Then, the coolant flows out from the coolant outlet 61 which is provided on a head side water jacket 60 in the rear of the cylinder head 40. In addition, a part of the coolant thus transported compressively is supplied to the water-cooling type oil cooler 65 via the introduction hose 68.

The lead-out opening of the water-cooling type oil cooler 65 is formed on the lower crankcase 45, and is connected to a second oil path 140 that extends to the rear side, being substantially parallel with the first oil path 133, slightly sloping up to the rear side. The second oil path 140 is connected to an oil gallery 173, the oil jet (not illustrated) and the like within the engine 15.

The engine oil L supplied in the engine 15 is returned to the oil pan 46 and reserved therein by a free drop-falling. This engine oil L is supplied into the engine 15 by way of the oil strainer 130, the oil pump 89, the oil filter 134, and the water-cooling oil cooler 65, again, thereby circulating through the inside of the engine. It is to be noted that when the engine rotates at a high velocity, hydraulic pressure of the engine oil transported compressively rises. When the hydraulic pressure reaches a predetermined value, an oil relief valve 142 is actuated, which is connected via a relief path 141, to a lower side of a crossing point of the first oil path 133 and the oil inflow path 136. Then, a part of the engine oil L flows back into the oil pan 46 and the hydraulic pressure within the path is adjusted.

Figure 4:
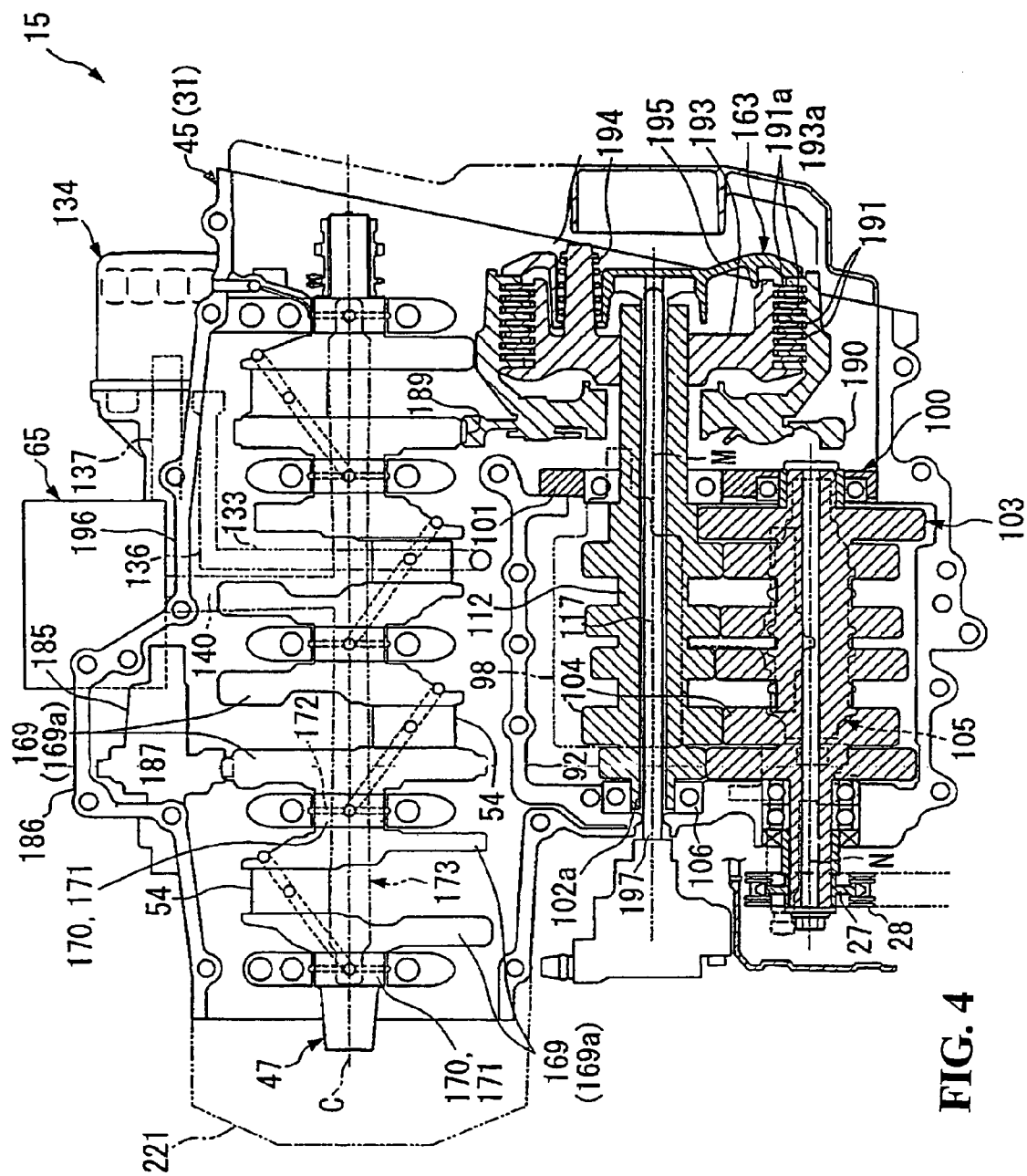
FIG. 4 is a cross-sectional view of FIG. 2, taken along line 4—4.

Furthermore, as shown in FIG. 3 and FIG. 4, in the front portion of the crankcase 31, a crankshaft 47 is disposed with an axis line C being parallel with the body width direction, and in the rear portion thereof, a clutch mechanism 163 and a cartridge type transmission 100 are disposed. Then, on the upper portion of the cartridge type transmission 100, components for the starting system including a starter motor 98, a reduction gear 99 and the like are placed, allowing the crankshaft 47 to rotate at the time of starting the engine.

The crankshaft 47 has the axis line C being positioned on the cut surface, and has crank pins 54 along the body width direction, the crank pin being coupled with the connecting rod 53 of the piston 51, so that the connecting rod is freely rotatable. Since this engine 15 is an in-line 4-cylinder engine, the crankshaft 47 has four crank pins 54. Each crank pin 54 is supported by a pair of crank arms 169. For each pair of crank arms 169, a counterweight 169*a* is integrally molded on a portion opposite to the crank pin 54. A balancer drive gear 187 for operating a secondary balancer 185 is provided on the periphery of the crank arm 169 that supports the second crank pin 54 from the left side. Furthermore, a primary drive gear 189 is provided on the periphery of the crank arm 169 that supports the fourth crank pin 54, i.e., on the right end. Both ends of the crankshaft 47 and journals 170 at five points being provided between each pair of the crank arms 169 as well as on the axis line C are supported freely rotatably on bearings 171, which are provided in the upper crankcase 44 and the lower crankcase 45. On the left end of the crankshaft 47, a generator serving as an electric generator is disposed and it is covered by a generator cover 221.

The clutch mechanism 163 has a primary driven gear 190 which engages with the primary drive gear 189 of the crankshaft 47, and includes a clutch outer 191 to rotate integrally therewith. The clutch outer 191 includes therein a clutch center 193 which is subjected to a spline coupling with the main shaft 102 of the cartridge type transmission 100 and rotates integrally therewith, and a plurality of friction plates such as 191*a* . . . , 193*a* . . . , on the clutch outer 191 side and the clutch center 193 side. The above members are responsible for transferring rotary power generated in the crankshaft 47 to the main shaft 102 of the cartridge type transmission 100. A pressure plate 195, which is urged by a plurality of clutch springs 194, are mounted on the clutch center 193, and with the pressure plate 195, both friction plates 191*a* . . . and 193*a* . . . are mutually contacted with pressure, thereby achieving a state wherein the clutch mechanism 163 becomes prepared for power transmission.

Figure 5:
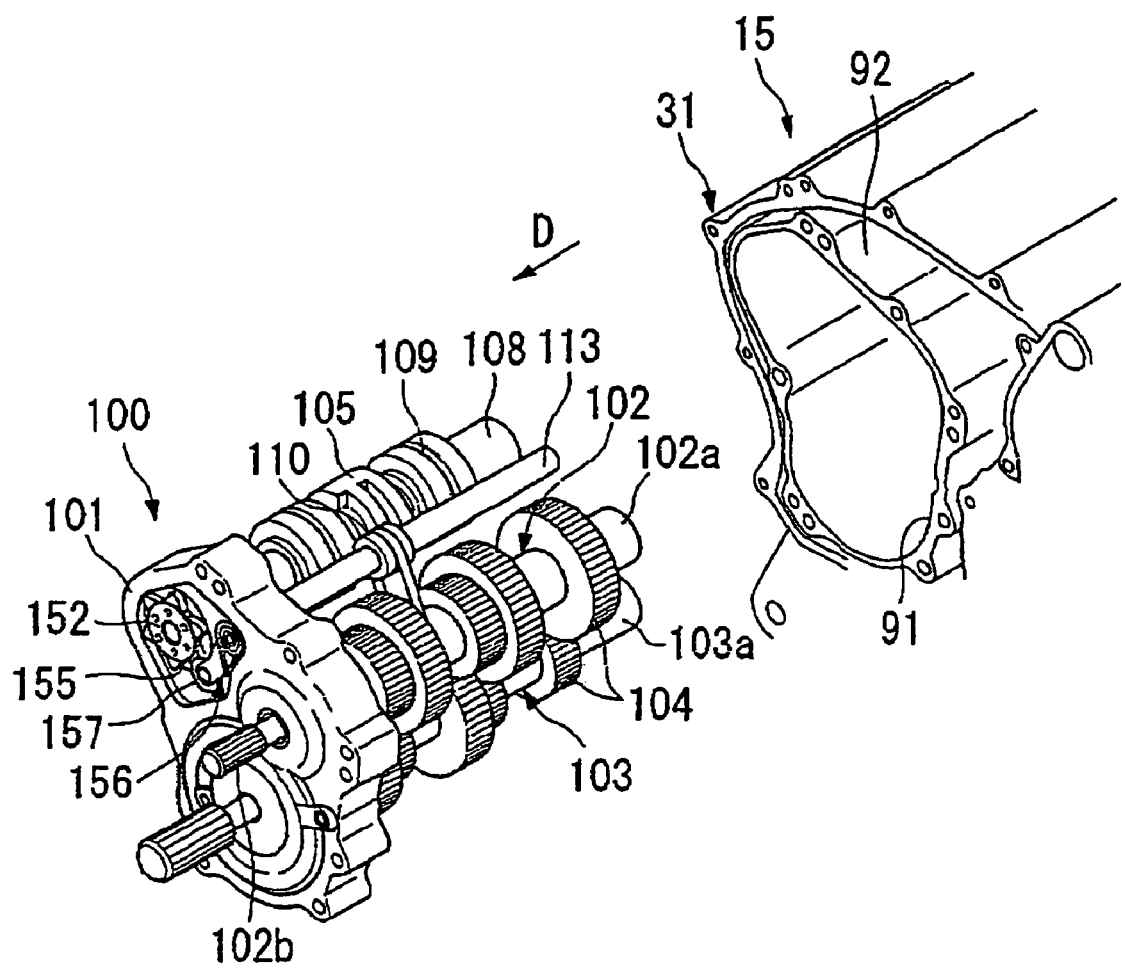
FIG. 5 is a diagram for explaining detachment/attachment of the cartridge type transmission.

Referring to a diagrammatic illustration of FIG. 5, the cartridge type transmission 100 will be further explained. FIG. 5 is an illustration of the engine 15, viewed from the right side, showing a status wherein the cartridge type transmission 100 is pulled out to the detaching direction as indicated by the arrow D.

As shown in FIG. 5, the cartridge type transmission 100 is a cartridge type transmission freely detachable and attachable from/to a transmission case unit 92 which is formed on the right rear side of the crankcase 31 with an opening 91. The cartridge type transmission 100 has a transmission holder 101 for covering the opening 91, and in the front upper side of the transmission holder 101, the main shaft 102 is pivotally supported in such a manner to be freely rotatably, via the bearing 107 (see FIG. 4). In the front lower side of the transmission holder 101, a counter shaft 103 for transferring rotary power of the main shaft 102 is pivotally supported in such a manner to be freely rotatably. Both of the shafts 102, 103 are provided with a group of transmission gears 104, in spline-engagement with each other. It is possible to select a gear ratio, by selecting a pair of transmission gears in a state of being engaged, out of a plurality of transmission gears constituting the group of transmission gears 104. The selection of transmission gears to be engaged is controlled by the shift drum 105 penetrating rotatably through the upper rear side of the transmission holder 101, and a plurality of shift forks to be actuated therewith (in FIG. 5, only the shift fork 110 is shown). In the cartridge type transmission 100, the rotation axes of the shift drum 105, the main shaft 102, and the counter shaft 103 are respectively arranged from the inside of the transmission holder 101 towards the left side, so that the axis line of each rotation axis becomes parallel with the axis line C of the crankshaft 47.

When the cartridge type transmission 100 is mounted on the engine 15, that is, the transmission case unit 92, as shown in FIG. 4, the left end 102a of the main shaft 102 is rotatably supported by the bearing 106 which is mounted on the left side wall 93 of the crankcase 31 (transmission case unit 92).

The left end 103a side of the counter shaft 103 as shown in FIG. 5 is pivotally supported via the bearing on the left side wall 93 (not illustrated), as well as penetrating into the left side wall 93. The drive sprocket 27 (see FIG. 2) is in spline-engagement with the portion of the left end 103a projecting from the left side wall 93. The left end 108 of the shift drum 105 is pivotally supported on the left side wall 93.

Figure 6:
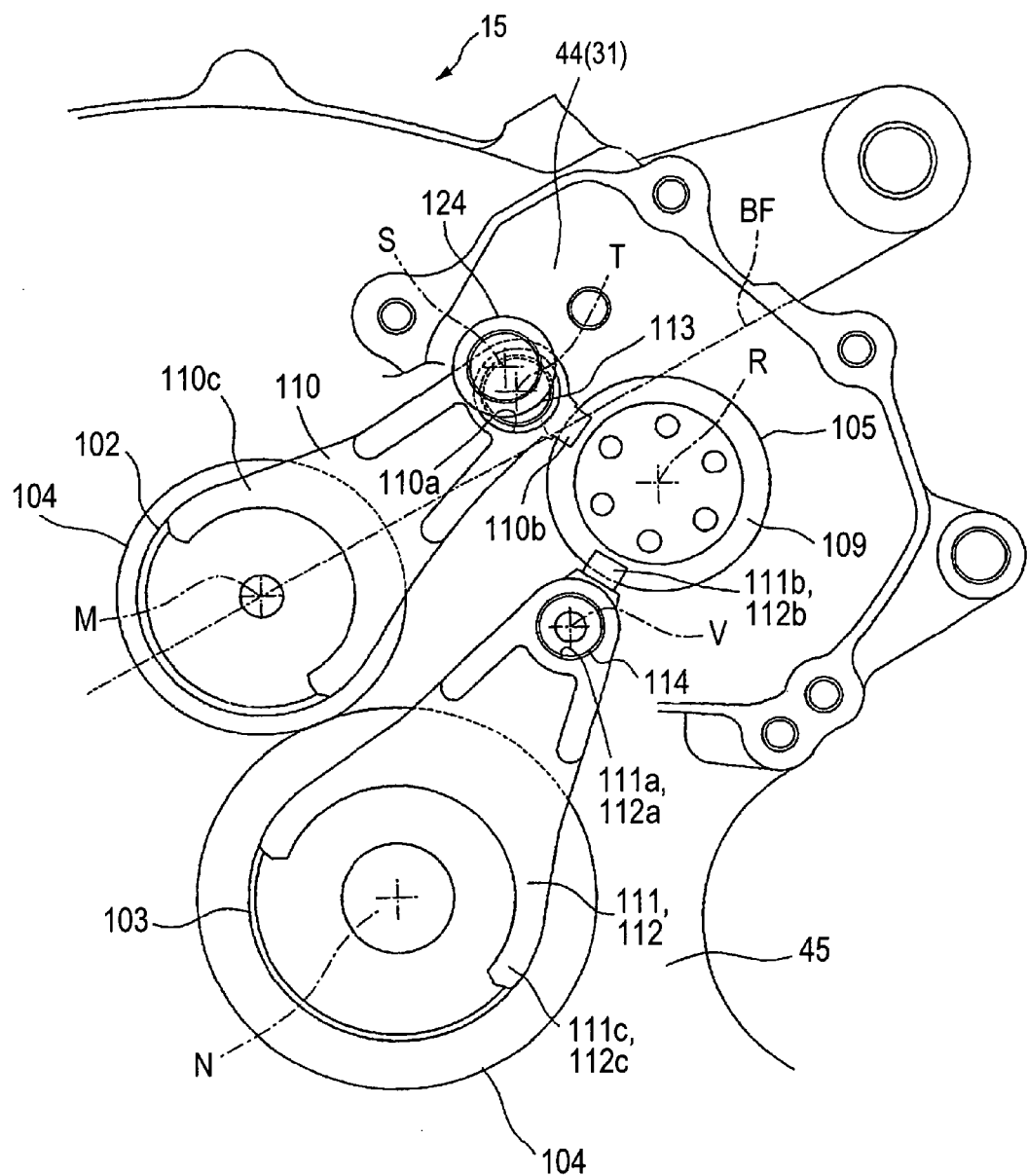
FIG. 6 is a right side view enlarged view of the engine for explaining the arrangement of the cartridge type transmission.

With reference to FIG. 2 and FIG. 6, an arrangement of each element will be explained in a state wherein the cartridge type transmission is attached to the engine 15.

As shown in FIG. 2, the cartridge type transmission 100 is arranged in the rear portion of the crankcase 31 of the engine 15.

As shown in FIG. 2 and FIG. 6, as for the main shaft 102, an axis line M of the rotation axis thereof is located on the cut surface BF of the upper crankcase 44 and the lower crankcase 45. This location is to the rear of the position where the crankshaft 47 is disposed, along the cut surface BF. As for the counter shaft 103, the axis line N of the rotation axis is positioned to the rear of the crank shaft 47, and further in the rear and lower side of the main shaft 102, and it is pivotally supported by the lower crankcase 45, which is on the lower side of the cut surface BF. As for the shift drum 105, the axis line R is positioned in substantially the rear of the main shaft 102, and further in the rear and upper side of the counter shaft 103 and it is pivotally supported by the lower crankcase 45. The axis line M of the main shaft 102, the axis line N of the counter shaft 103, and the axis line R of the shift drum 105 are arranged in this order from the front side in a plan view.

As for the shift fork shaft 113 penetrating through the shift fork 110, the axis line T of the rotation axis is positioned in the upper rear side of the main shaft 102 and in the front upper side of the shift drum 105, and it is pivotally supported on the upper crankcase 44 which is on the upper side of the cut surface BF. Furthermore, two shift forks 111, 112 are disposed between the shift drum 105 and the counter shaft 103, and the shift fork shaft 114 penetrates into both the shift forks 111, 112. As for the shift fork shaft 114, the axis line V is positioned in the upper rear side of the counter shaft 103 and in the lower front side of the shift drum 105, and it is pivotally supported by the lower crankcase 45. Both the shift fork shafts 113, 114 are arranged in a position closer to the shift drum 105, rather than the shafts 102, 103.

Figure 7:
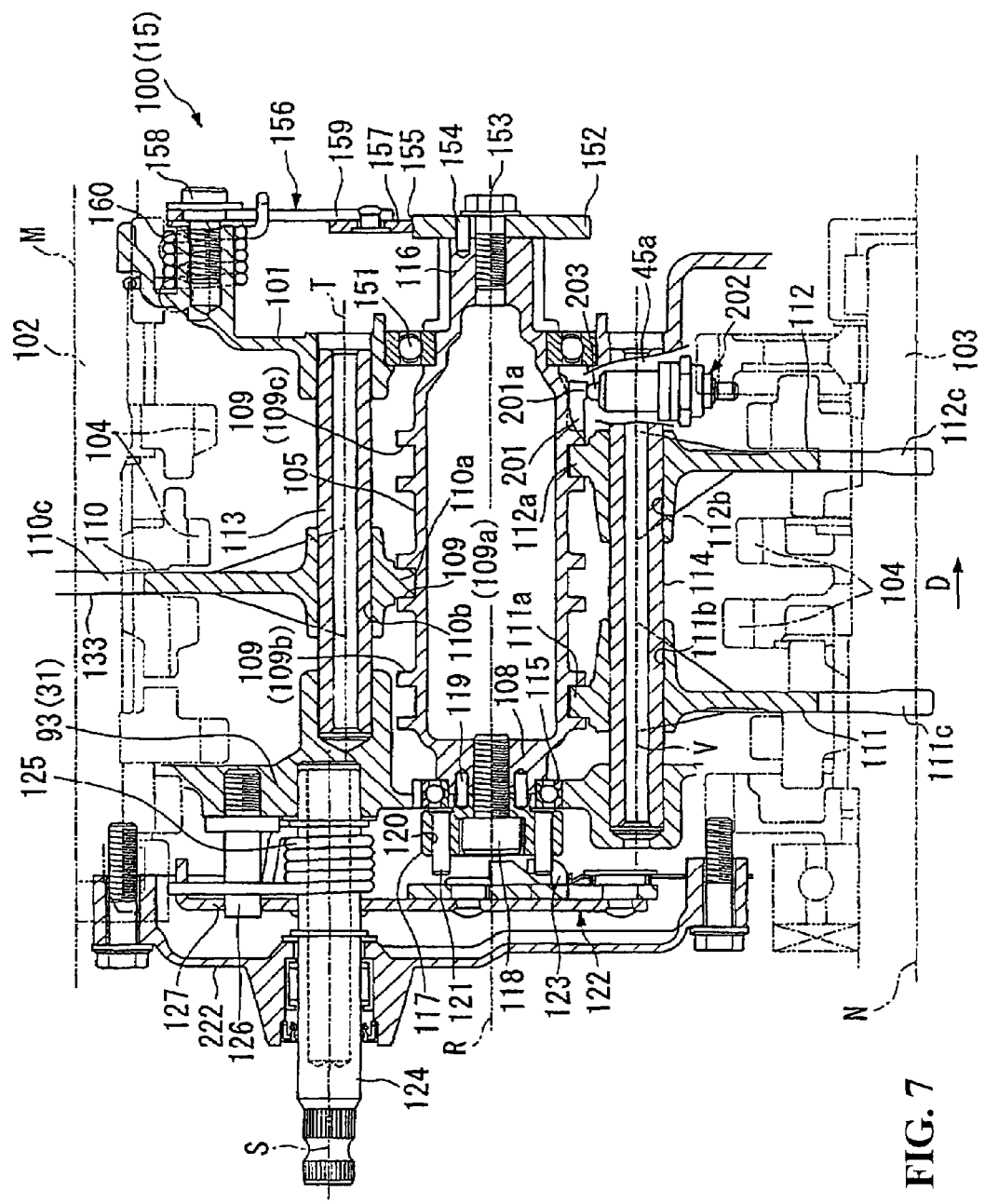
FIG. 7 is a development showing the shift drum.

As shown in FIG. 7, the shift drum 105 has a plurality of grooves 109 on the peripheral surface of a cylindrical shape, the left end 108 thereof is pivotally supported on the left side wall 93 of the crankcase 31 via the bearing 115, and the right end 116 is pivotally supported by the bearing 151 on the transmission holder 101. The groove 109 has a form undergoing displacement along the axis line R. The grooves 109 are formed so that they are prepared for all the gears including neutral. The shift forks 110, 111, 112 to be engaged with the grooves are shifted in the direction of axis line R along the groove 109, and then the engagement of the group of transmission gears 104 is controlled, thereby shifting gears. One end 110a of the shift fork 110 is engaged with the center groove 109a, and one end 111a of the shift fork 111 and one end 112a of the shift fork 112 are respectively engaged with the grooves 109b and 109c at the sides.

The shift fork 110 has a through-hole 110b through which the shift fork shaft 113 penetrates, and one end 110a engaged with the shift drum 105 and the other end 110c engaged with the group of transmission gears 104 on the main shaft 102 side extend from the boss of the through-hole 110b. The other end 110c has a tip end branching into two directions, to be engaged with the grooves provided on a predetermined transmission gear out of the group of the transmission gears 104. As for the shift fork shaft 113, the axis line T is arranged in parallel with the axis line C of the crankshaft 47, the right end is pivotally supported by the upper crankcase 44 (see FIG. 6), and the left end is pivotally supported by the transmission holder 101. The shift fork 110 is slidable along the longitudinal direction (axis line T) of the shift fork shaft 113. Therefore, when the shift drum 105 is rotated, and one end 110a of the shift fork 110 is pressed in the left and right directions, the entire shift fork 110 is moved also in the left and right directions, and allows the group of gears 104 on the main shaft 102 side to slide along the axis line M of the main shaft 102.

The shift fork 111 has a through-hole 111b through which the shift fork shaft 114 penetrates, and one end 111a engaged with the shift drum 105 and one end 111c engaged with the group of transmission gears 104 on the counter shaft 103 side extend from the boss of the through-hole 111b. The other end 111c has a tip end branching into two directions, to be engaged with the grooves provided on a predetermined transmission gear out of the group of the transmission gears 104. Similarly, as for the shift fork 112, one end 112a and the other end 112c extend from the boss of the through-hole 112b. The axis line V of the shift fork shaft 114 is arranged in parallel with the axis line C of the crankshaft 47, and the right end is pivotally supported by the lower crankcase 45

(see FIG. 6), and the left end is pivotally supported by the transmission holder 101. The shift forks 111, 112 are slidable along the axis line V of the shift fork shaft 114. Therefore, with the shift drum 105, the shift forks 111, 112 are movable in the left and right directions. When the shift forks 111, 112 move, predetermined transmission gears out of the group of gears 104 on the counter shaft 103 side, respectively engaged with the other ends 111c, 112c are allowed to slide along the axis line N of the counter shaft 103.

Furthermore, as for details of the shift drum 105 and the mechanism for controlling the shift drum 105 will be explained with reference to FIG. 10, which is a cross sectional view of FIG. 8, taken along line 10—10.

The shift drum 105 has a substantially cylindrical shape and has a plurality of grooves 109 on the periphery. The grooves 109 are engaged with one end of the shift forks 110, 111 and 112, respectively. It is to be noted that the other end of the shift forks 110, 111 and 112 are branching in two directions, and are engaged with the group of transmission gears 104. Furthermore, between the one end and the other end of the shift fork 110, a shift fork shaft 113 passes through, being arranged in parallel with the axis line of the shift drum 105. Similarly, between the one end and the other end of the shift forks 111, 112, a shift fork shaft 114 passes through, being arranged in parallel with the axis line of the shift drum 105.

The left end 108 of the shift drum 105 is pivotally supported on the left side wall 93 in such a manner as to be freely rotatable, and on the right end face thereof, the shift plate 117 is fixed with a bolt 118. A dowel pin 119 is inserted into the abutting surface between the shift plate 117 and the left end 108, and the shift plate 117 and the shift drum 105 is integrally rotatable.

The shift plate 117 has a circular shape in a side view, and a center thereof is fixed by the bolt 118, as well as it has six through-holes 120 substantially equally spaced, on a concentric circle. The through-holes 120 are provided in parallel with the axis line R of the shift drum 105, and into the respective holes, drum pins 121 are inserted from the inside towards the outside (the left side) along the axis line of the shift drum 105. The drum pin 121 projects in the direction opposite to the direction to detach the cartridge type transmission 100 as indicated by the arrow D in FIG. 5. At least one of the projecting drum pins 121 is engaged with an engaging hook 123 of the shift arm 122, externally from the width direction of the engine 15 (cartridge type transmission 100).

The shift arm 122 has an elongate shape along the longitudinal direction of the engine 15, in the rear side thereof, the engaging hook 123 is pulled up towards the shift drum 105, and it is fixedly attached to a change spindle 124 in the front side. The change spindle 124 is pivotally supported on the upper crankcase 44 (see FIG. 6) rotatably on the left side wall 93 of the crankcase 31, and a coil shaped shift return spring 125 is mounted thereon. The shift arm 122 has a slit 127 on the upper rear side of the change spindle 124, and the stopper pin 126 fixed on the left side wall 93 loosely fits into the slit 127. One end of the above shift return spring 125 is engaged with the stopper pin 126 from the upper side, and an urging force is given to the stopper pin in a radial direction (a direction opposite to the arrow E in FIG. 2) with respect to the shift arm 122. Since the stopper pin 126 is inserted into the slit 127 formed on the shift arm 122, rotation amount of the shift arm 122 is controlled by the stopper pin 126.

The change spindle 124 penetrates into a gear shift linkage cover 222, which covers the shift arm 122. As shown in FIG. 6, the axis line S of the rotation axis of the change spindle 124 is positioned in the upper side of the cut surface BF of the crankcase 31, and is also positioned in the rear upper side of the main shaft 102. This is a position in the front upper side, if viewed from the shift drum 105, and this position is partially overlapped with the shift fork shaft 113 in a side view.

Figure 10:
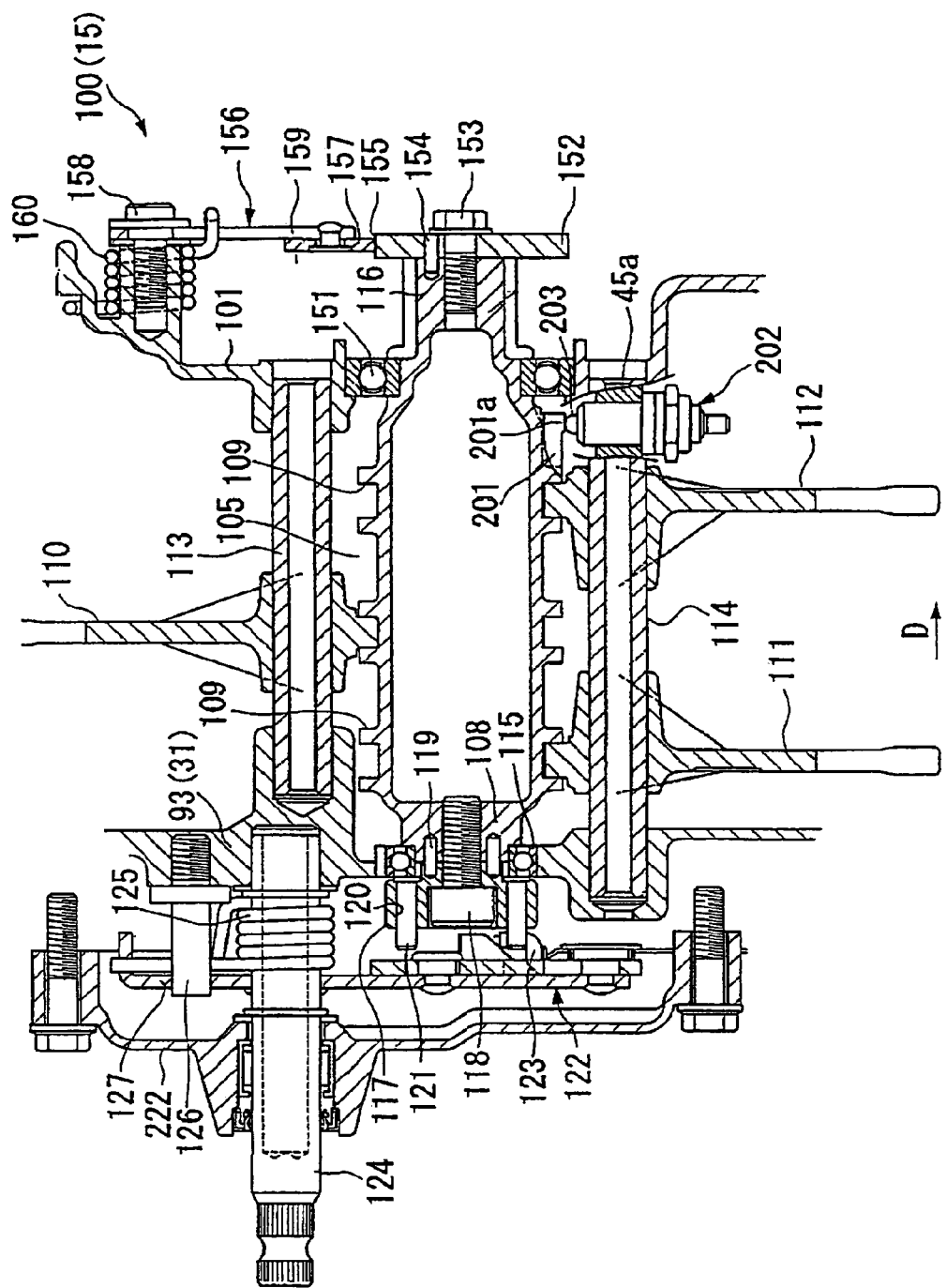
FIG. 10 is a cross-sectional view showing the shift drum, taken along line 10—10 of FIG. 8.

As shown in FIG. 10, the change spindle 124 penetrates into a gear shift linkage cover 222, which covers the shift arm 122. In addition, as illustrated in FIG. 2, one end in the front side of the link member 145 is fixed on the change spindle 124. The link member 145 extends from one end towards the rear side along the engine 15, and the other end is coupled with the upper portion of the rod 147 via the pin 146. The lower portion of the rod 147 is coupled with the change pedal 148 for the shift change, being mounted so that it can swing with respect to the engine 15. The joint between the lower portion of the rod 147 and the change pedal 148 is provided on a point between the pin 149 as a center for swinging and a point of action where the driver puts his/her foot. It is to be noted that the above change pedal 148, the rod 147, the link member 145, the change spindle 124, and the shift arm 122 are arranged on the left side of the engine 15.

On the other hand, as shown in FIG. 7, the right end 116 of the shift drum 105 is supported rotatably by the bearing 151 on the transmission holder 101, and penetrates into the transmission holder 101. A stopper plate 152 is fixed on the right end face of the shift drum 105 via the bolt 153, so that the rotation of the shift drum 105 is controlled. A dowel pin 154 is fitted with pressure into the abutting surface between stopper plate 152 and the right end 116, and the stopper plate 153 and the shift drum 105 rotate integrally.

The stopper plate 152 has a groove 155 of a curved surface shape along the periphery, and at a center portion the stopper plate is fixed with the bolt 153. As shown in FIG. 3, the stopper plate 152 is a type of plate which can shift the cartridge type transmission 100 in six gears, and has a shape of a star substantially, provided with six grooves 155 being associated with the arrangement of the aforementioned drum pins 121. A stopper roller 157 of the stopper roller assembly 156 is elastically contacted to one of the grooves 155. As shown in FIG. 7, the stopper roller assembly 156 has a structure wherein a lever member 159 is mounted in such a manner as to be capable of swinging on the bolt 158 which is set up from the transmission holder 101, and the stopper roller 157 is rotatably mounted on the tip end of the lever member 159. A coil-like return spring 160 is placed on the bolt 158, so that it urges the lever member 159 in the direction for pressing the stopper roller 157 against the stopper plate 152.

Furthermore, the shift drum 105 has a cam surface 201 in the right side peripheral portion, being inside rather than the bearing 151. The cam surface 201 has a projecting portion (cam) 201a associated with all the gears including neutral. Furthermore, at the position corresponding to the cam surface 201, a sensor 202 for detecting a rotational position of the shift drum 105 is mounted on the wall portion 45a of the rear side of the lower crankcase 45. This sensor 202 is mounted from the outside of the wall portion 45a, and a detecting pin 203 at the tip end of the sensor abuts against the cam surface 201 in a substantially perpendicular direction with respect to the cam surface 201 (or axis line R of the shift drum 105).

Figure 11:
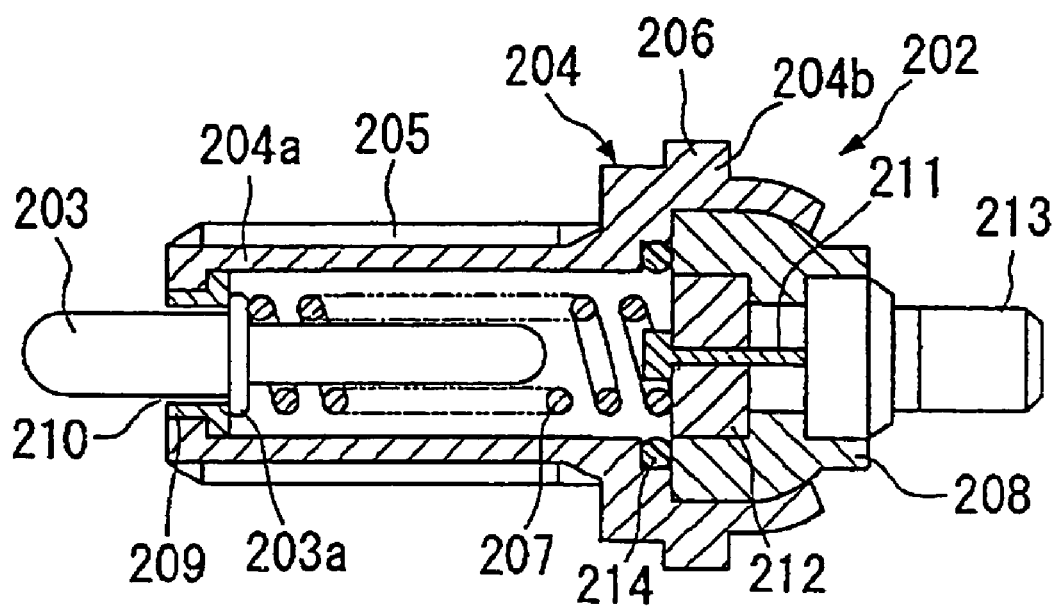
FIG. 11 is a cross-sectional view of the sensor.

As shown in FIG. 11, the sensor 202 has a main unit 204 taking the shape of hollow tube, and the diameter of a rear portion 204b is expanded with staged molding, with respect to the front portion 204a on which male screw 205 is formed. On the rear portion 204b, a hexagonal portion 206 is formed for hooking a spanner and the like. Furthermore, a detecting pin 203, a coil-like spring 207, and a base terminal 208 are inserted into the main unit 204 in this order from the rear portion 204b side of large diameter. The detecting pin 203 has a spherical shape on the tip, and has a flange 203a whose diameter is expanded along the periphery between one end and the other end. Since the diameter of the flange 203a is smaller than the opening diameter of the opening end 210 on the front portion 204a side of the main unit 204, the detecting pin 203 will not fall off the opening end 210. The detecting pin 203 is made of conducting material, and a sleeve 209 made of an insulator is internally inserted into the opening end 210. Furthermore, one end side of the coil-like spring 207 abuts against the flange 203a of the detecting pin 203, from the rear portion 204b side. Therefore, the detecting pin 203 is constantly urged towards the opening end 210 (cam surface 201) side. The other end side of the spring 207 abuts against an insulating member 212 of the base terminal 208. The base terminal 208 has a conductive contact member 211 on the central axis of the sensor 202, and the periphery thereof is covered with the insulating member 212. The contact member 211 is connected to a terminal 213 for current detecting, and the entire base terminal 208 is mounted on the rear portion 204b of the main unit 204 by a rivet process. In addition, between the step inside of the hollow portion and the base terminal 208, an O-ring 214 is inserted.

Next, operations of the present embodiment will be explained.

When the engine 15 is started, rotary power generated in the crankshaft 47 as shown in FIG. 3 and FIG. 4 is transferred to the main shaft 102 of the cartridge type transmission 100 via the clutch mechanism 163. The main shaft 102 is coupled with the counter shaft 103 via a pair of transmission gears in a state of engaged, being selected out of the group of transmission gears 104. Therefore, the counter shaft 103 is rotated in a rotation ratio being associated with the gear ratio of the transmission gear. Accordingly, the rotary power is transferred from the main shaft 102 to the counter shaft 103, and the rear wheel 7 is rotated via the drive chain 28 by the drive sprocket 27, which is mounted on the left side of the counter shaft 103 (see FIG. 1).

Here, when the gears are to be shifted, the driver steps on the change pedal 148 as shown in FIG. 2. When the change pedal 148 is stepped on downwardly pivoting about the pin 149, the rod 147 is pulled substantially downwardly, the link member 145 coupled with the upper portion of the rod 147 via the pin 146 swings downwardly pivoting about the change spindle 124. Then, the engaging hook 123 of the shift arm 122, which is integrally formed with the change spindle 124 also swings in a clockwise direction (in a direction indicated by arrow E of FIG. 2), pivoting about the change spindle 124. The drum pin 121 is pressed down by a predetermined amount, and the shift plate 117 is rotated. Then, the shift drum 105 integrally fixed with the shift plate 117 also rotates by an angle equal to the rotation angle of the shift plate 117.

At this timing, the stopper plate 152 integrally fixed to the shift drum 105 is also rotated. The stopper plate 152 presses back the stopper roller 157 of the stopper roller assembly 156, which elastically contacts to the stopper plate 152. The stopper roller 157 is pressed back along the peripheral surface of the stopper plate 152. When the stopper plate 143 rotates by the rotation angle corresponding to one of the grooves 155, it fits into the groove 155 subsequent to this rotation, by the urging force of the return spring 160. Accordingly, the rotation of the stopper plate 152 and the shift drum 105 integrally fixed thereon is stopped.

When the driver lifts his/her foot off the change pedal 148, it returns upwardly. The shift arm 122 is returned by the shift return spring 125 into the direction opposite to the arrow E of FIG. 2, until the stopper pin 126 abuts against the slit 127, and then, the shift arm 122 engages with the next drum pin 121.

In the case where the shape of the grooves 109 as shown FIG. 7 are displaced to the left or right of the axis line direction, the engagement positions with the shift forks 110, 111, 112 are shifted to the left or right direction, when the shift drum 105 is rotated. For example, if the groove 109a engaged with one end 110a of the shift fork 110 has a shape displaced to the right side around the gear changing one end 110a of the shift fork 110 it is also sifted to the right side along the groove 109a in the process of rotating the shift drum 105. Since the shift fork 110 is slidably supported on the shift fork shaft 113, the entire shift fork 110 is shifted to the right side. Furthermore, the two-way portion of the other end 110c of the shift fork 110 is engaged with the group of transmission gears 104 in the main shaft side 102 side, based on the shifting of the other end 110c to the right side, the transmission gear on the main shaft 102 side engaging with the other end 110c is also shifted to the right side. If the groove 109 has a shape displacing to the left side around the gear changing, the shift fork 110 is shifted to the left side, and the transmission gear is also shifted to the left side. Furthermore, if the groove 109 has a shape without any displacement to the left or right sides around gear changing, neither the shift fork 110 nor the group of the transmission gears 104 are shifted.

Similarly, as for the group of transmission gears 104 on the counter shaft 103 side, when the engagement positions between the shift forks 111, 112, and the grooves 109b, 109c of the shift drum 105 respectively are displaced to the left or the right side, the transmission gears are shifted accordingly to the right side or the left side. If the engagement positions are not displaced, there is no shifting.

The groove 109a, groove 109b, and groove 109c of the shift drum 105 are respectively formed, a groove shape for shifting to the left side and a groove shape for shifting to the right side when the shift drum 105 is rotated, and a groove shape that does not allow the shift forks 110, 111, 112 are not shifted even when the shift drum 105 is rotated. The groove shapes are formed in such a manner as being respectively associated with the gears including neutral. Therefore, when the driver selects the first gear, the shift forks 110, 111, 112 are shifted in response to the shapes of the groove 109a, 109b, 109c of the shift drum 105, and predetermined transmission gears become being engaged, thereby forming the first gear. When the gear is changed from the first to the second, the shift forks 110, 111 and 112 are shifted in response to the shapes of the grooves 109a, 109b, and 109c, and the engagement state of the transmission gears which has formed the first gear is released, and at the same time substantially, the transmission gears constituting the second gear become engaged.

At this time, since the cam surface 201 is rotated simultaneously, a current is outputted from the sensor 202. In other words, before the rotation of the shift drum 105, a projection 201a of the cam surface 201 presses the detecting pin 203, the detecting pin 203 as shown in. FIG. 11 comes into contact with the contact member 211. Then, an electric current passes through the cam surface 201 and the contact member 211, and the current is outputted from the terminal 157.

When the shift drum 105 is rotated by cooperation between the shift arm 122 and the drum pins 121, by an operation of the aforementioned change pedal 148, the engagement of the projection 201a and the detecting pin 203 is released. Accordingly, the detecting pin 203 is pressed back by the spring 207, thereby rendering the cam surface 201 and the contact member 211 in an insulated status. Thus, an outputting of the current from the terminal 213 is stopped.

Furthermore, when the shift drum 105 is stopped at a rotation angle corresponding to a predetermined transmission gear by a cooperation between the stopper plate 152 and the stopper assembly 156, a projection 201 a associated with the transmission gear presses the detecting pin 203 again, and a current is outputted from the terminal 213.

The projection 201a is formed on the cam surface 201 in such a manner as being associated with all the transmission gears including neutral. Therefore, by monitoring the current outputted from the sensor 202, it is possible to detect the transmission gear which changes in turn. Here, the length of the hollow portion of the sensor 202 and the length of the detecting pin 203 are made as follows. When the detecting pin 203 is pressed against the projection 203a, the detecting pin 203 comes to contact with the contact member 211. Besides this case, the detecting pin 203 and the contact member 211 are in a state of non-contact.

It is to be noted that when the shift drum 105 as shown in FIG. 10 is rotated, the engagement position between the grooves 109 formed on the periphery of the shift drum and each of the shift forks 110, 111, and 112 are changed. The grooves 109, which are associated with the transmission gear before the rotation, allow the engaged shift forks 110, 111, and 112 to shift along the axis line direction of the shift drum 105. Since the shift forks 110, 111, and 112 are slidably supported by the shift fork shafts 113, 114, when one end of each of the shift forks 110, 111, and 112 is shifted, the two portions of the other ends are also shifted to the same direction. The shift forks 110, 111, and 112 engaged with the grooves 109, which are associated with the transmission gear before the rotation, slide along the shift forks shafts 113, 114, and then allow the associated gears to slide in the axis direction of the other shafts 102, 103, thereby releasing the engagement with the gears of the shafts 102, 103. On the other hand, the shift forks 110, 111 and 112 engaging with the grooves 109, which are associated with the transmission gear after the rotation, slide along the shift fork shafts 113, 114, and allow the associated transmission gears to slide in the axis line direction of the other shafts 102, 103, thereby establishing an engagement with predetermined transmission gears of the shafts 102, 103.

When the cartridge type transmission 100 is detached from the crankcase 31, firstly, the crankcase covers on the left and the right sides of the engine 15 are removed. When the crankcase cover on the left side is removed, the left end 103a of the counter shaft 103 appears, and then the drive sprocket 27 (see FIG. 2) fixed to the left end is removed. On the other hand, when the crankcase cover on the right side is removed, the clutch mechanism 163 appears, and then it is detached to expose the transmission holder 101. Next, the bolts on the periphery of the transmission holder 101 are removed, the transmission holder 101 is pulled out along the arrow D of FIG. 5, and the cartridge type transmission unit 100 is taken out from the crankcase 31. At this timing, the main shaft 102, the counter shaft 103, and the shift drum 105, being pivotally supported on the transmission holder 101 are also pulled out from the crankcase 31. Since the stopper plate 152 and the stopper roller assembly 156 are provided on the transmission holder 101 side, they are pulled out with the transmission holder 101. Similarly, the shift plate 117 on which the drum pin 121 is mounted is pulled out from the crankcase 31 together with the shift drum 105. On the other hand, the shift arm 122 having been engaged with the drum pin 121 remains on the crankcase 31 side (see FIG. 6).

When, the cartridge type transmission 100 is attached to the crankcase 31, as shown in FIGS. 4 and 5, the transmission holder 101 is inserted into the transmission case unit 92 of the crankcase 31. At this time, the shift plate 117 penetrates into the left side wall 93 of the transmission case unit 92, and the drum pin 121 is engaged with the engaging hook 123. In this condition, the transmission holder 101 is fixed on the crankcase 31 with bolts, and the clutch mechanism 163 is mounted on the right end 102b of the main shaft 102 (see FIG. 5), which projects to the right side from the transmission holder 101. On the other hand, since the counter shaft 103 projects on the left side of the engine 15, the drive sprocket 27 is fixed on the counter shaft 103. Subsequently, the crankcases on both sides are attached. In this manner, the cartridge type transmission 100 can be detached without separating the crankcase 31 by the cut surface BF.

As shown in FIG. 2 and FIG. 6, in the present embodiment, the engine 15 having the cartridge type transmission 100 has a configuration wherein the main shaft 102 is arranged on the cut surface BF of the crankcase 31, and the change spindle 124 and the shift fork shaft 113 are supported in the upper side of the cut surface BF. Since the change spindle 124 and the shift fork shaft 113 are arranged in the space on the rear upper side of the main shaft 102, which has not been utilized conventionally, the empty space can be utilized effectively. Furthermore, the change spindle 124 and the shift fork shaft 113, and the shift functional components cooperative therewith, including the shift drum 105, the shift fork 110, the shift arm 122 and the like, are arranged in a higher position in the crankcase 31. Therefore, flexibility of the layout for the lower part of the main shaft 102 can be enhanced. Furthermore, the arrangement of the shift functional components is optimized, whereby the cartridge type transmission 100 can be downsized. Therefore, the length in the longitudinal direction of the engine 15 can be shortened.

Since the shift arm 122 and the transmission holder 101 are arranged in such a manner as to be separated in the left and right directions, the transmission holder 101 can be detached without detaching the shift arm 122. Therefore, detachment/attachment of the cartridge type transmission 100 is simplified, and maintainability can be more enhanced.

Furthermore, the change spindle 124 and the like are arranged in the upper side of the main shaft 102, while the counter shaft 103 is arranged in the lower crankcase 45 in the lower side of the main shaft 102. Since the components of the cartidge type transmission 100 are arranged vertically with respect to the main shaft 102, the length of the cartridge type transmission in the longitudinal direction is further shortened, thereby reducing the length of the engine in the longitudinal direction. In addition, the maintainability is further enhanced.

The present invention is not limited to the present embodiment. For example, the cartridge type transmission 100 can be applied to a transmission for a three-wheeled cycle, a four-wheel vehicle, a ship or the like.

The cut surface BF of the crankcase 31 does not necessarily have a slope, or it may have a slope that the front side is up rather than the rear side. When the shift drum 105 is pivotally supported on the upper crankcase 44 side of the crankcase 31, the same effects can be achieved. Similarly, the shift fork shaft 114 may be pivotally supported on the upper crankcase 44 side.

As shown in FIG. 10, in the present embodiment, the shift drum transmission 100 is configured as a detachable/attachable unit from/to the engine 15 and includes a plurality of drum pins 121 integrally disposed with the shift drum 105, which are positioned on the left side of the engine. On the other hand, the stopper plate 152 which is responsible for controlling the rotational amount of the shift drum 105 is arranged on the right side of the engine 15. Since the drum pins 121 are arranged in the direction into which the shift drum transmission 100 is mounted (the direction opposite to arrow D), and the drum pins 121 are engaged with the shift arm 122 which is on standby in the foreside of the mounting direction (the left side of the engine 15). Therefore, the shift drum transmission 100 can be detached and attached without removing from the engine 15 the shift arm 122 for driving the drum pins 121. Under this condition, checks and components replacement of the shift drum transmission 100 is facilitated, thereby enhancing maintainability. Furthermore, since the drum pins 121 and the stopper plate 152 are arranged in such a manner as to be separated to left and right, layouts can be simplified for the components such as the shift arm 122 and the stopper roller assembly 156, which cooperate with the drum pins 121 and the stopper plate 152 as compared to the case where the drum pins 121 and the stopper plate are collectively arranged.

A contact type sensor 202 for detecting the rotational position of the shift drum 105 is arranged in such a manner as approaching the cam surface 201, which is provided on the shift drum 105 to be associated with a shift gear. Therefore, it is possible to detect the rotational position of the shift drum 105 when the driver allows the shift drum 105 to rotate by stepping on the change pedal 148. Every time when a current is outputted from the sensor 202, lights illuminate sequentially on the display unit (not illustrated) which shows the transmission gears on the dashboard panel, thereby allowing the driver to be aware of the current transmission gear.

Furthermore, the sensor 202 is arranged in the vicinity of the stopper plate 152, and in substantially a vertical direction with respect to the axis line of the rotational axis of the shift drum 105. Therefore, compared to the case where the sensor 202 is arranged on the axis line of the shift drum 105, it is possible to downsize the shift drum transmission 100. In addition, compared to the case where the sensor 202 is provided integrally with the shift drum 105, the maintainability can be enhanced.

It is also possible to arrange the sensor 202 in a direction parallel with the axis line of the shift drum 105.

In the embodiment as described above, it is necessary for the sensor 202 to be energized via the cam surface 201. However, the sensor may be configured such that the sensor itself has an input terminal and an output terminal for the current, and when the detecting pin 203 is pressed against the projection 201a both terminals become in energized state, thereby outputting the current.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine having a cartridge type transmission comprising:
    a crankcase which includes an upper crankcase and a lower crankcase, being divided vertically, a crankshaft and a main shaft, which are pivotally supported by a cut surface of said crankcase;
    said cartridge type transmission being configured such that rotary power of said main shaft is transferred to said counter shaft and being detachable without separating said crankcase;
    wherein a change spindle and at least one shift fork shaft are pivotally supported by the upper crankcase.

2. The engine having said cartridge type transmission according to claim 1, wherein said counter shaft is pivotally supported by said lower crankcase.

3. The engine having said cartridge type transmission according to claim 1, and further including a shift drum aligned in the same direction as said change spindle.

4. The engine having said cartridge type transmission according to claim 3, wherein said shift drum includes grooves disposed therein and a plurality of shift forks are arranged along a length of said shift drum and in engagement within selected grooves thereof.

5. The engine having said cartridge type transmission according to claim 1, and further including a shift arm operatively positioned relative to said cartridge type transmission and drum pins projecting therefrom for engaging with said shift arm.

6. The engine having said cartridge type transmission according to claim 3, and further including a stopper plate mounted on one side of said shift drum for controlling the rotation of said shift drum.

7. The engine having said cartridge type transmission according to claim 6, wherein said stopper plate includes a plurality of grooves for selectively enabling the positioning of said shift drum in a plurality of rotary positions.

8. The engine having said cartridge type transmission according to claim 3, wherein said shift drum includes a cam surface and a sensor is mounted relative to said cam surface for detecting the rotational position of said shift drum.

9. An engine having a cartridge type transmission comprising:
    a crankshaft and a main shaft pivotally supported by a crankcase;
    the cartridge type transmission being configured such that rotary power of said main shaft is transferred to a counter shaft and being detachable in the width direction of said crankcase;
    wherein a shift arm for rotating a shift drum and a transmission holder of said cartridge type transmission are arranged to be divided on left and right sides of a vehicle.

10. The engine having said cartridge type transmission according to claim 9, wherein said shift drum includes grooves disposed therein and a plurality of shift forks are arranged along a length of said shift drum and in engagement within selected grooves thereof.

11. The engine having said cartridge type transmission according to claim 9, wherein said shift arm is operatively positioned relative to said cartridge type transmission and drum pins projecting therefrom for engaging with said shift arm.

12. The engine having said cartridge type transmission according to claim 9, and further including a stopper plate mounted on one side of said shift drum for controlling the rotation of said shift drum.

13. The engine having said cartridge type transmission according to claim 12, wherein said stopper plate includes a plurality of grooves for selectively enabling the positioning of said shift drum in a plurality of rotary positions.

14. A cartridge type shift drum transmission, which is freely detachable and attachable from/to an engine comprising:
- a plurality of shift forks actuated by rotating a shift drum for shifting gears, and the rotation of said shift drum is controlled by a stopper plate;
- said stopper plate being arranged on one end of said shift drum, and a plurality of drum pins for rotating said shift drum are arranged on the other end of said shift drum.

15. The cartridge type shift drum transmission according to claim 14, wherein a sensor for detecting the rotational position of said shift drum is arranged in the vicinity of said stopper plate along a direction substantially vertical with respect to the rotational axis of said shift drum.

16. The cartridge type shift drum transmission according to claim 14, wherein said shift drum includes grooves disposed therein and said plurality of shift forks are arranged along a length of said shift drum and in engagement within selected grooves thereof.

17. The cartridge type shift drum transmission according to claim 14, and further including a shift arm operatively positioned relative to said cartridge type transmission and drum pins projecting therefrom for engaging with said shift arm.

18. The cartridge type shift drum transmission according to claim 14, wherein said stopper plate includes a plurality of grooves for selectively enabling the positioning of said shift drum in a plurality of rotary positions.

19. The cartridge type shift drum transmission according to claim 14, wherein said shift drum includes a cam surface and a sensor is mounted relative to said cam surface for detecting the rotational position of said shift drum.

20. The cartridge type shift drum transmission according to claim 14, wherein said sensor includes a detecting pin operatively mounted for selective extension and retraction with a housing and in engagement with said cam surface for detecting the rotational position of said shift drum.

* * * * *